M. LE R. MUNGER.
TIRE VULCANIZER.
APPLICATION FILED DEC. 23, 1918.
1,311,613.
Patented July 29, 1919.
3 SHEETS—SHEET 1.
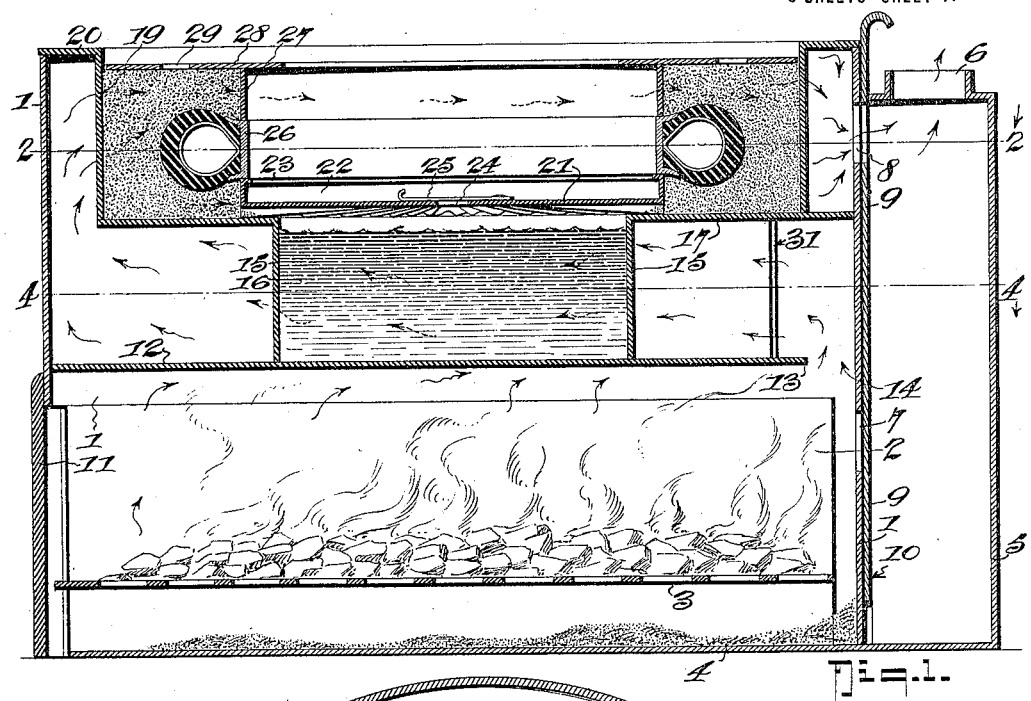
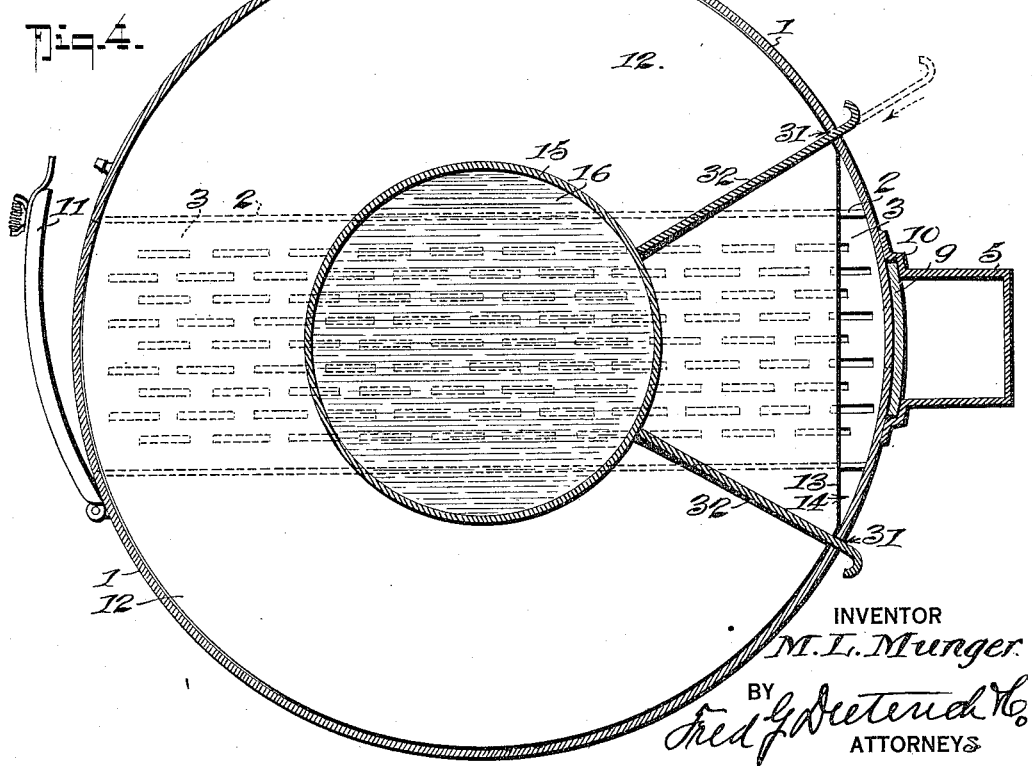
INVENTOR
M. L. Munger.
BY
Fred G. Dieterich
ATTORNEYS

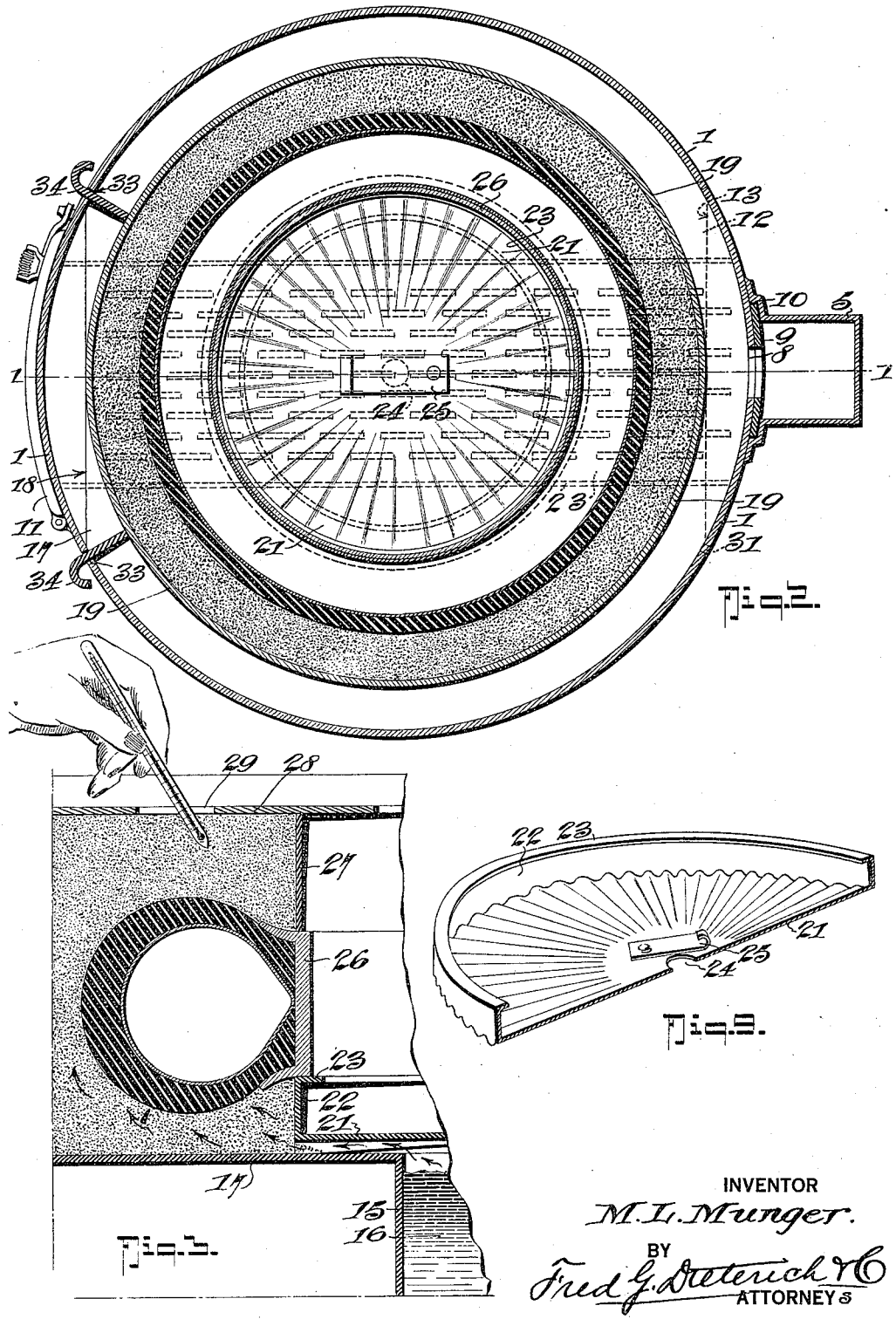

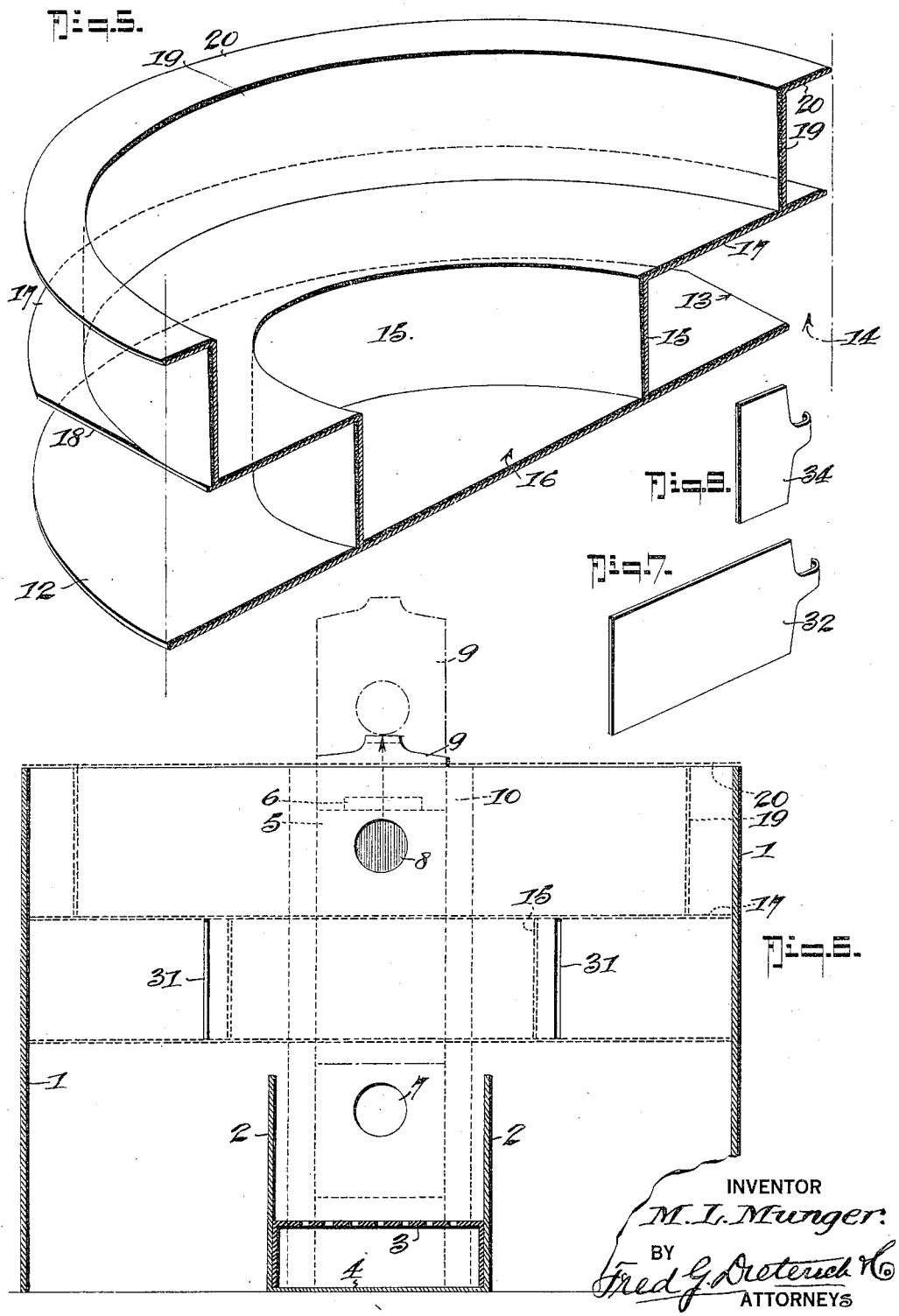

UNITED STATES PATENT OFFICE.

MELVIN LE ROY MUNGER, OF PITTSBURGH, PENNSYLVANIA, ASSIGNOR TO EVERETT B. SAWYER, OF LINCOLN, NEBRASKA.

TIRE-VULCANIZER.

1,311,613.

Specification of Letters Patent.    Patented July 29, 1919.

Application filed December 23, 1918. Serial No. 267,951.

*To all whom it may concern:*

Be it known that I, MELVIN L. MUNGER, residing at present at Pittsburgh, in the county of Allegheny and State of Pennsylvania, have invented certain new and useful Improvements in Tire-Vulcanizers, of which the following is a specification.

My invention relates to the art of rubber tire manufacture and repair and it primarily has for its object to provide an improved apparatus for the purpose wherein is provided a furnace or heat generator having a vulcanizing chamber member that has provision for effective circulation of heat to bring the sand around the tire to the proper and uniform temperature to vulcanize the rubber, means being provided for regulating and directing the heat for uniform distribution and application and means also being provided whereby tires of various sizes may be vulcanized on their rims. Means are also provided for generating steam for producing the necessary moisture to permeate the sand.

Another object of the invention is to provide a vulcanizer of a simple and inexpensive structure which can be manufactured at a minimum expense and will effectively serve its intended purpose.

The invention also includes those novel details of construction, combination and arrangement of parts all of which will be first described, then be specifically pointed out in the appended claims and illustrated in the accompanying drawings, in which:

Figure 1 is a central vertical longitudinal section of the invention taken on the line 1—1 of Fig. 2.

Fig. 2 is a horizontal section taken on the line 2—2 of Fig. 1.

Fig. 3 is an enlarged detail vertical section of a portion of the invention.

Fig. 4 is a horizontal section on the line 4—4 of Fig. 1.

Fig. 5 is a sectional perspective view of the partition member which embraces the water chamber and the vulcanizing chamber.

Fig. 6 is a vertical cross section of the housing and grate, the partition member shown in Fig. 5 being removed.

Figs. 7 and 8 are perspective views of each of the gates employed for directing and controlling the heat circulation.

Fig. 9 is a detail sectional perspective view of the combined cover for the water chamber and support for the tire rim.

Referring now to the accompanying drawings, in which like numerals and letters of reference indicate like parts in all of the figures, 1 represents the housing which has a pair of vertical walls 2 extending from an opening in the walls of the housing 1 that is closable by a door 11, the walls 2 being located to form the sides of the furnace or combustion chamber in which the grate 3 is located, the housing having a bottom 4 beneath the grate 3, as shown in Figs. 1 and 6.

5 is a chimney box that communicates with the interior of the housing at two levels through the lower opening 7 and the upper opening 8, the lower opening 7 being in alinement with the combustion chamber and the upper opening being adjacent to the top of the housing in alinement with one of the circulation passages hereinafter referred to. The openings 7 and 8 are governed by a gate 9 which, when in the position shown in full lines in Fig. 1, enables the heat to pass through the circulating passages and out into the chimney box at its top from whence it escapes through the opening 6. When the gate 9 is raised, however, to close the opening 8, the opening 7 can be brought into register with the chimney box 5 so that the products of combustion and heat may pass through the opening 7 directly into the chimney box. The gate 9 operates in ways 10 shown in Fig. 4.

The partition and chamber forming member is preferably constructed as a unit and is indicated in Fig. 5. It consists of the bottom plate 12 above the combustion chamber, the plate 12 having a portion removed at 13 to leave a passage 14 at the rear of the combustion chamber for the products of combustion and heat to pass up above the plate 12. 17 is an intermediate plate located a predetermined distance above the plate 12 and also forming a horizontal partition in the housing 1, the end of that partition opposite the opening 14 is removed, as at 18, so that the products of combustion can pass, at the front of the apparatus up to the upper level where they are confined against escape through the top of the housing by the horizontal ring plate 20.

15 is a vertical annular wall connecting the plates 12 and 17 and forming a water reservoir 16, the top of which is open to communicate with the level above the plate 17 and 19 is a vertical annular partition that connects the plate 18 with the plate 20 so as to form an interior vulcanizing chamber and spaced sufficiently from the wall 1 to leave an exterior heat circulating passage. It will be noted that the diameter of the annular wall 19 is considerably greater than that of the wall 15.

21 is a combined lid or cover for the water chamber 16 and support for the tire to be vulcanized. It has a corrugated bottom to allow steam escape beneath the bottom in a radial or fan-like form and it also has a central steam escape aperture 24 adapted to be governed more or less by a slide 25. The cover also has a vertical upstanding annular rim 22 and an inturned flange 23 on which the rim 26 of the tire is adapted to lie, as is best shown in Figs. 1 and 3 of the drawings.

27 is an annular ring adapted to be laid on the rim 26 and to receive a cap plate 28 which is also of ring form, i. e., provided with a central opening for the escape of steam and access to the interior space formed by the ring 27, rim 26 and flange 22. The chamber inclosed by the wall 19, plate 28, ring 27, rim 26 and flange 22 forms the vulcanizing box proper in which sand is placed and packed around the tire according to the usual practice, and as best shown in Figs. 1 and 3 of the drawings. The plate 28 has openings 29 at intervals so that a thermometer (see Fig. 3) may be inserted to determine the temperature of the sand box at different places around the circle. If it is found that the temperature is not even, i. e., too hot or too cool, on one side or the other, the temperature can be regulated by use of the gates 32—34 which are insertible through slots 31 and 33 respectively in the wall 1, the gate 32 being insertible at either side of the passageway 14 in the first level of the circulating passage so that, if desired, the heat can be entirely cut off against circulation or can be cut off to a greater or less extent accordingly as to whether the gates 32 are inserted their full distance or not. If it is desired to permit the heat to circulate in the lower circulating level but not in the upper level, the gates 34 are employed to close the passage to the upper level.

It should be understood that in practice the rings 27 and the covers 21 with their flanges 22 are made in different sizes to fit the different diameter rims of the tires and, in practice, when it is desired to vulcanize a tire the water is placed in the water compartment 16, the cover 21 of the required diameter is put on; after which, the tire, mounted on its rim, is laid into place and sand packed down under the tire; after which the ring 27 is put into place and additional sand packed on top to the required depth, when the plate 28 is put on to close the sand box. The gates 32 and 34 are opened and the gate 9 is adapted to permit the opening 8 to register with the chimney box. Heat then passes from the combustion chamber through the opening 14 into the lower circulating level around the water box 16 to the diametrically opposite end of its level where it passes up through the opening left by the removed part 18 of the partition plate 17, to the upper level and from thence around to the wall 19 and escapes through the opening 8. If too much heat is passing to one side or the other, the gates 32 and 34 are adjusted to compensate therefor. After the required temperature of the sand box has been reached the opening 8 is closed and the opening 7 is brought into communication with the chimney box so that the heat and products of combustion can then pass directly into the chimney box; only so much of the heat pocketing above in the circulating passages as may be required to keep the sand box at the particular temperature desired.

From the foregoing description, taken in connection with the accompanying drawings, it is thought the complete construction, operation and advantages of my invention will be readily understood by those skilled in the art to which the invention appertains.

What I claim is:

1. A vulcanizer comprising a housing having a heat generating chamber and a chimney box, a partition unit within the housing comprising a lower partition wall, an intermediate partition wall and a top ring, a water reservoir between the lower and intermediate walls, an annular wall between the intermediate wall and the top ring embracing a vulcanizing chamber with which the water reservoir communicates, means whereby a circulation of heat may be created from the generating chamber up between the lower and intermediate walls around the water reservoir and up between the intermediate wall and the top ring around the vulcanizing chamber, said housing having a heat escape port from the heat generating chamber to the chimney box and another port from the space above the intermediate wall to the chimney box, and a gate for controlling said ports.

2. A vulcanizer comprising a housing having a heat generating chamber and a chimney box, a partition unit within the housing comprising a lower partition wall, an intermediate partition wall and a top ring, a water reservoir between the lower and intermediate walls, an annular wall between the intermediate wall and the top ring embracing a vulcanizing chamber with which the water reservoir communicates, means whereby a circulation of heat may be created from the generating chamber up between the lower and intermediate walls around the water reservoir and up between the intermediate wall and the top ring around the vulcanizing chamber, said housing having a heat escape port from the heat generating chamber to the chimney box, another port from the space above the intermediate wall to the chimney box, a gate for controlling said ports, an annular rim for supporting a tire on its rim within the vulcanizing chamber, a ring laid on the rim of the tire, and a cap plate on said last named ring to form a sand box in which the tire to be vulcanized is located and sand in said sand box embedding said tire.

3. In a vlucanizer, a housing, a plurality of transverse partitions dividing said housing into a lower, an upper and an intermediate chamber, a heat escape port from the lower to the intermediate chamber at one side and a similar port from the intermediate to the upper chamber at the other side, a chimney box, heat escape ports from the upper and lower chambers to the chimney box, a gate controlling said last named escape ports, an annular wall in the intermediate chamber extending from one adjacent partition to the other to form a water reservoir, an annular wall in the upper chamber inclosing a tire receiving compartment with which said water reservoir communicates, a combined cover and tire support for covering the water reservoir and including a flange for extending the tire on its rim in the tire receiving compartment, a ring on the tire rim and a cap plate held on said ring to close the space between said ring and the adjacent wall of the housing.

4. In a vulcanizer, a housing, a plurality of transverse partitions dividing said housing into a lower, an upper and an intermediate chamber, a heat escape port from the lower to the intermediate chamber at one side and a similar port from the intermediate to the upper chamber at the other side, a chimney box, heat escape ports from the upper and lower chambers to the chimney box, a gate controlling said last named escape ports, an annular wall in the intermediate chamber extending from one adjacent partition to the other to form a water reservoir, an annular wall in the upper chamber inclosing a tire receiving compartment with which said water reservoir communicates, a combined cover and tire support for covering the water reservoir and including a flange for extending the tire on its rim in the tire receiving compartment, a ring set on the tire rim, a cap plate held on said ring to close the space between said ring and the adjacent wall of the housing, and means for governing the escape of steam from said water reservoir.

5. A vulcanizer comprising a housing having a heat generating chamber and a chimney box, a partition unit within the housing comprising a lower partition wall, an intermediate partition wall and a top ring, a water reservoir between the lower and intermediate walls, an annular wall between the intermediate wall and the top ring embracing a vulcanizing chamber with which the water reservoir communicates, means whereby a circulation of heat may be created from the generating chamber up between the lower and intermediate walls around the water reservoir and up between the intermediate wall and the top ring around the vulcanizing chamber said housing having a heat escape port from the heat generating chamber to the chimney box and another port from the space above the intermediate wall to the chimney box, a gate for controlling said ports, and baffles insertible through slots in the walls of the housing for regulating the circulation of the heat.

6. A vulcanizer comprising a housing having a heat generating chamber and a chimney box, a partition unit within the housing comprising a lower partition wall, an intermediate partition wall and a top ring, a water reservoir between the lower and intermediate walls, an annular wall between the intermediate wall and the top ring embracing a vulcanizing chamber with which the water reservoir communicates, means whereby a circulation of heat may be created from the generating chamber up between the lower and intermediate walls around the water reservoir and up between the intermediate wall and the top ring around the vulcanizing chamber, said housing having a heat escape port from the heat generating chamber to the chimney box, another port from the space above the intermediate wall to the chimney box, a gate for controlling said ports, an annular rim for supporting a tire on its rim within the vulcanizing chamber, a ring laid on the rim of the tire, a cap plate on said last named ring to form a sand box in which the tire to be vulcanized is located and sand in said sand box embedding said tire, and baffles insertible through slots in the walls of the housing for regulating the circulation of the heat.

7. In a vulcanizer, a housing, a plurality of transverse partitions dividing said housing into a lower, an upper and an intermediate chamber, a heat escape port from the lower to the intermediate chamber at one side and a similar port from the intermediate to the upper chamber at the other side, a chimney box, heat escape ports from the upper and lower chambers to the chimney box, a gate controlling said last named escape ports, an annular wall to the intermediate chamber extending from one adjacent partition to the other to form a water reservoir, an annular wall in the upper chamber inclosing a tire receiving compartment with which said water reservoir communicates, a combined cover and tire support for covering the water reservoir and including a flange for extending the tire on its rim in the tire receiving compartment, a ring set on the tire, a cap plate held on said ring to close the space between said ring and the adjacent wall of the housing, and baffles insertible through slots in the walls of the housing for regulating the circulation of the heat.

8. In a vulcanizer, a housing, a plurality of transverse partitions dividing said housing into a lower, an upper and an intermediate chamber, a heat escape port from the lower to the intermediate chamber at one side and a similar port from the intermediate to the upper chamber at the other side, a chimney box, heat escape ports from the upper and lower chambers to the chimney box, a gate controlling said last named escape ports, an annular wall in the intermediate chamber extending from one adjacent partition to the other to form a water reservoir, an annular wall in the upper chamber inclosing a tire receiving compartment with which said water reservoir communicates, a combined cover and tire support for covering the water reservoir and including a flange for extending the tire on its rim in the tire receiving compartment, a ring set on the tire rim, a cap plate held on said ring to close the space between said ring and the adjacent wall of the housing, means for governing the escape of steam from said water reservoir, and baffles insertible through slots in the walls of the housing for regulating the circulation of the heat.

9. In a vulcanizer, a housing, a plurality of transverse partitions dividing said housing into a lower, an upper and an intermediate chamber, a heat escape port from the lower to the intermediate chamber at one side and a similar port from the intermediate to the upper chamber at the other side, a chimney box, heat escape ports from the upper and lower chambers to the chimney box, a gate controlling said last named escape ports, an annular wall in the intermediate chamber extending from one adjacent partition to the other to form a water reservoir, an annular wall in the upper chamber inclosing a tire receiving compartment with which said water reservoir communicates, a combined cover and tire support for covering the water reservoir and including a flange for extending the tire on its rim in the tire receiving compartment, a ring set on the tire rim and a cap plate held on said ring to close the space between said ring and the adjacent wall of the housing, and baffle gates inserted through slots in the walls of the housing at either side of the heat escape ports between the respective chamber levels for regulating the flow of heat and thereby governing the vulcanizing temperature within the tire receiving chamber.

10. In a vulcanizer, a housing, a chamber forming unit sustained in said housing and comprising a bottom partition plate, an annular vertical wall secured thereon to form a water reservoir, an intermediate partition plate extending from the upper extremity of said annular vertical wall, a second annular vertical wall extended up from said intermediate partition plate, an upper ring plate extended from the upper extremity of said second annular vertical wall, the lower and intermediate partition plates having parts removed to afford circulation of heat, means in the housing below said unit for generating the heat, and controlled means for allowing heat escape from said housing, means for sustaining a tire in the chamber of said unit which is encircled by the upper vertical wall, and a cap plate to fit over the tire and coöperate with the sustaining means to provide a sand box for the tire and sand in said sand box in which the tire is adapted to be embedded.

11. In a vulcanizer, a housing, a chamber forming unit sustained in said housing and comprising a bottom partition plate, an annular vertical wall secured thereon to form a water reservoir, an intermediate partition plate extending from the upper extremity of said annular vertical wall, a second annular vertical wall extended up from said intermediate partition plate, an upper ring plate extended from the upper extremity of said second annular vertical wall, the lower and intermedite partition plates having parts removed to afford circulation of heat, means in the housing below said unit for generating the heat, and controlled means for allowing heat escape from said housing, means for sustaining a tire in the chamber of said unit which is encircled by the upper vertical wall, a cap plate to fit over the tire and coöperate with the sustaining means to provide a sand box for the tire and sand in said sand box in which the tire is adapted to be embedded, and means for controlling the heat circulation around and through said unit.

12. In a vulcanizer, a housing, a chamber forming unit sustained in said housing and comprising a bottom partition plate, an annular vertical wall secured thereon to form a water reservoir, an intermediate partition plate extending from the upper extremity of said annular vertical wall, a second annular vertical wall extended up from said intermediate partition plate, an upper ring plate extended from the upper extremity of said second annular vertical wall, the lower and intermediate partition plates having parts removed to afford circulation of heat, means in the housing below said unit for generating the heat, controlled means for allowing heat escape from said housing, means for sustaining a tire in the chamber of said unit which is encircled by the upper vertical wall, a cap plate to fit over the tire and coöperate with the sustaining means to provide a sand box for the tire and sand in the said sand box in which the tire is adapted to be embedded, means for controlling the heat circulation around and through said unit, said means comprising gates insertible through slots in the housing wall to project between the adjacent pairs of partition plates.

MELVIN LE ROY MUNGER.

Copies of this patent may be obtained for five cents each, by addressing the "Commissioner of Patents. Washington, D. C."